(12) United States Patent
Burkey

(10) Patent No.: US 7,623,130 B1
(45) Date of Patent: Nov. 24, 2009

(54) TEXT RENDERING WITH IMPROVED COMMAND STREAM OPERATIONS

(75) Inventor: John F. Burkey, Chicago, IL (US)

(73) Assignee: Apple Inc., Cupertino, CA (US)

( * ) Notice: Subject to any disclaimer, the term of this patent is extended or adjusted under 35 U.S.C. 154(b) by 578 days.

(21) Appl. No.: 11/113,815

(22) Filed: Apr. 25, 2005

(51) Int. Cl.
*G06T 11/00* (2006.01)

(52) U.S. Cl. ........................ 345/467; 345/469
(58) Field of Classification Search ........... 345/467, 345/469; 711/135
See application file for complete search history.

(56) References Cited

U.S. PATENT DOCUMENTS

| | | | | |
|---|---|---|---|---|
| 5,416,898 A * | 5/1995 | Opstad et al. | ............... | 345/468 |
| 5,517,601 A * | 5/1996 | Rust et al. | ............... | 358/1.11 |
| 5,526,477 A * | 6/1996 | McConnell et al. | ......... | 345/467 |
| 5,870,084 A * | 2/1999 | Kanungo et al. | ............ | 345/551 |
| 5,990,913 A * | 11/1999 | Harriman et al. | ............ | 345/531 |
| 6,081,623 A * | 6/2000 | Bloomfield et al. | ......... | 382/239 |
| 6,356,268 B1 * | 3/2002 | Beaman et al. | ............ | 345/467 |
| 6,493,800 B1 * | 12/2002 | Blumrich | .................... | 711/129 |
| 6,657,625 B1 * | 12/2003 | Chik et al. | ................. | 345/467 |
| 6,738,526 B1 * | 5/2004 | Betrisey et al. | ............ | 382/260 |
| 6,754,875 B1 * | 6/2004 | Paradies | .................... | 715/262 |
| 6,782,432 B1 * | 8/2004 | Nelson et al. | .................. | 710/1 |
| 6,803,913 B1 * | 10/2004 | Fushiki et al. | ............. | 345/467 |
| 6,831,652 B1 * | 12/2004 | Orr | ........................... | 345/543 |
| 6,867,872 B1 * | 3/2005 | Kurihara et al. | ............ | 358/1.11 |
| 7,002,583 B2 * | 2/2006 | Rabb, III | .................... | 345/473 |
| 7,046,250 B1 * | 5/2006 | Slott et al. | ................. | 345/555 |

\* cited by examiner

*Primary Examiner*—M Good Johnson
(74) *Attorney, Agent, or Firm*—Wong, Cabello, Lutsch, Rutherford & Brucculeri LLP

(57) ABSTRACT

A system, method, and computer program for high-speed, efficient text rendering are disclosed. In accordance with certain embodiments of the present invention, an image resource architecture is provided for optimal sub-image uploads to keep the glyph cache up to date. A glyph cache is divided into zones, or sub-caches, wherein requests for writing a glyph bitmap to the cache may be handled by destroying or clearing an entire zone. In accordance with other embodiments of the present invention, a highly efficient method of rendering is provided wherein commands are automatically combined and made into larger commands for the GPU. Alternatively, rather than performing a command stream flush upon each intersection, a texture cache flush may be implemented. All source glyph bitmaps may be placed into one texture.

15 Claims, 4 Drawing Sheets

TEXT RENDERING WITH IMPROVED COMMAND STREAM OPERATIONS

BACKGROUND OF THE INVENTION

1. Field of the Invention

The present invention relates generally to computer graphics and imaging, and more particularly, to a system, method, and software for high-speed rendering of text to a display screen or other medium.

2. Related Art

Text is traditionally known as the written representation of spoken language. Text comprises a set of symbols that, when displayed in a meaningful order, conveys information. A writing system is generally a method of depicting words visually. A writing system can serve one or several languages. For example, the Roman writing system serves many languages, including French, Italian, and Spanish.

A writing system's alphabet, numbers, punctuation, and other writing marks consist of characters. A character refers to a symbolic representation of an element of a writing system. Simple examples of a character include the lowercase letter "a" and the number "1." Some software programs provide multilingual support and are capable of displaying characters in other languages such as Korean, Chinese, and Japanese, etc.

A glyph refers to the concrete, visual representation of a character. A glyph may represent one character (e.g., the lowercase letter "a"). A glyph may also represent more than one character (e.g., the fi ligature). A glyph may also represent part of a character (e.g., the dot in the lowercase letter "i"). A glyph may also represent a nonprinting character (e.g., the space character). A font is a collection of glyphs of similar design that usually have some element of design consistency, such as the shape of the ovals (known as the counter), the design of the stem, stroke thickness, or the use of serifs.

In text rendering, a request is received to render glyphs, advances, font, and Gstate. An advance refers to the white space to the next glyph, in the X and Y directions. Gstate refers to the state of various style attributes, such as color, clip, and compositing mode.

Rendering text using a GPU (graphics processor unit) includes the steps of laying out lines using advances, glyphs, and font; determining which glyph bitmaps are needed; generating bitmaps; uploading the bitmaps to the GPU; generating a series of textured rectangles to draw glyphs; and instructing the GPU what to draw.

Programmable GPUs run programs that are generally called fragment programs. The name "fragment" program derives from the fact that the unit of data being operated upon is generally a pixel, i.e., a fragment of an image. The GPUs can run a fragment program on several pixels simultaneously to create a result, which is generally referred to by the name of the buffer in which it resides. GPUs use data input generally called textures, which are analogous to a collection of pixels.

Many different types of computer programs, such as desktop publishing programs, word processing programs, graphic design programs, and web page authoring programs, provide the capability for users to display text in a variety of ways. Text rendering is one of the most important facets of operating system user interface performance. In addition, with the advancement in rendering techniques, including LCD (liquid crystal display) text rendering, the process has become more and more intensive.

SUMMARY OF THE INVENTION

In view of trends toward more visually rich presentation and denser displays in applications and operating systems, text rendering has become more complex and time-intensive. For many applications, text rendering can act as a bottleneck in system performance. Rendering high-quality text quickly presents several engineering challenges, including non linear gamma blending, non-integer glyph advances, and the inability to implement an LCD blend with accepted usages of GPUS.

A need therefore exists for a system, method, and software for text rendering that overcomes the limitations of the prior art. The present invention improves upon the prior art by providing for high-speed, efficient text rendering using novel caching and flushing techniques. Among other things, the present invention provides a very fast text rendering architecture which overcomes several critical engineering constraints to achieve optimal performance.

In accordance with certain embodiments according to the present invention, an image resource architecture is provided for optimal sub-image uploads to keep the glyph cache up to date. The glyph cache may be divided into a plurality of zones, or sub-caches, wherein requests for writing a glyph bitmap to the cache may be handled by destroying or clearing an entire zone. The image resource architecture is designed for fast, bulk destruction of aging glyphs while avoiding the problem of creeping 2D heap holes.

In accordance with other embodiments according to the present invention, a highly efficient method of rendering is provided wherein commands are automatically combined and made into larger commands before being provided to the GPU. Intersections between glyphs are monitored, and the command stream is terminated and a new command stream is started upon the occurrence of an intersection. Alternatively, rather than performing a command stream stop and start upon each intersection, a texture cache flush may be implemented. All source glyph bitmaps may be placed into one texture.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE INVENTION

The present invention is broadly directed to the manner in which text is rendered for display on a display device, such as a display screen, or other medium or device. In addition, the present invention may provide for rendering to a hardware accelerated bitmap, which can be useful as temporary buffer for rasterization for printing. While the particular hardware components of a computer system do not form a part of the invention itself, they are briefly described herein to provide a thorough understanding of the manner in which the features of the invention cooperate with the components of a computer system to produce the desired results.

Figure 1:
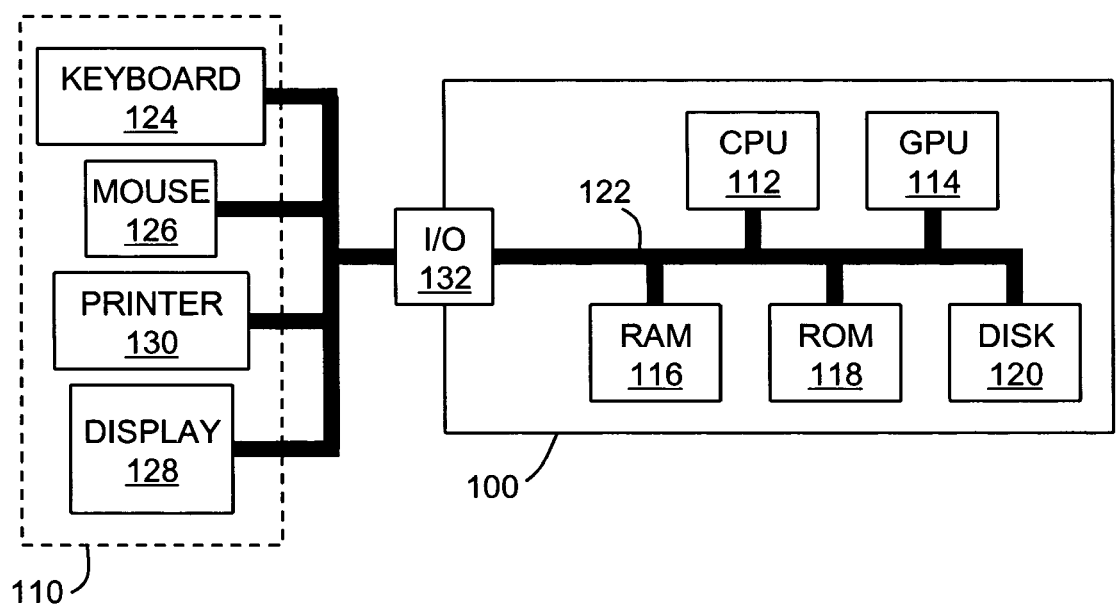
FIG. 1 depicts a block diagram of an exemplary computer system for implementing an embodiment of the present invention.

Reference is now made to FIG. 1, which depicts an exemplary computer system comprising a computer 100 having a variety of peripheral devices 110 communicably coupled thereto. One or more of the peripheral devices 110 may be operatively coupled to the computer 100. In other words, the peripheral devices 110 may be wired to the computer 100 via a cable or wire, or they may be wirelessly linked to the computer 100, or they may be integrated with computer 100. The computer 100 includes a central processing unit ("CPU") 112, a GPU 114, and associated memory. The memory may include a main working memory which is typically implemented in the form of a random access memory ("RAM") 116, a static memory that can comprise a read only memory ("ROM") 118, and a permanent storage device, such as a magnetic or optical disk 120, all three of which are examples of a computer-readable medium having computer-executable instructions. The CPU 112 communicates with each of these forms of memory through an internal bus 122.

The peripheral devices 110 may include a data entry device 124 such as a keyboard or keypad, and a pointing or cursor control device 126 such as a mouse, trackball, pen, or the like. A display device 128, such as an LCD screen or CRT (cathode ray tube) monitor, provides a visual display of the information that is being processed within the computer 100, such as, for example, the contents of a document or a computer generated image. A tangible copy of this information can be provided via a printer 130, or other appropriate device. Other peripheral devices 110 may be provided including but not limited to one or more microphones, speakers, cameras, scanners, disk drives, memory readers/writers, etc. The peripheral devices 110 may communicate with the CPU 112 by means of one or more input/output ports 132.

Figure 2:
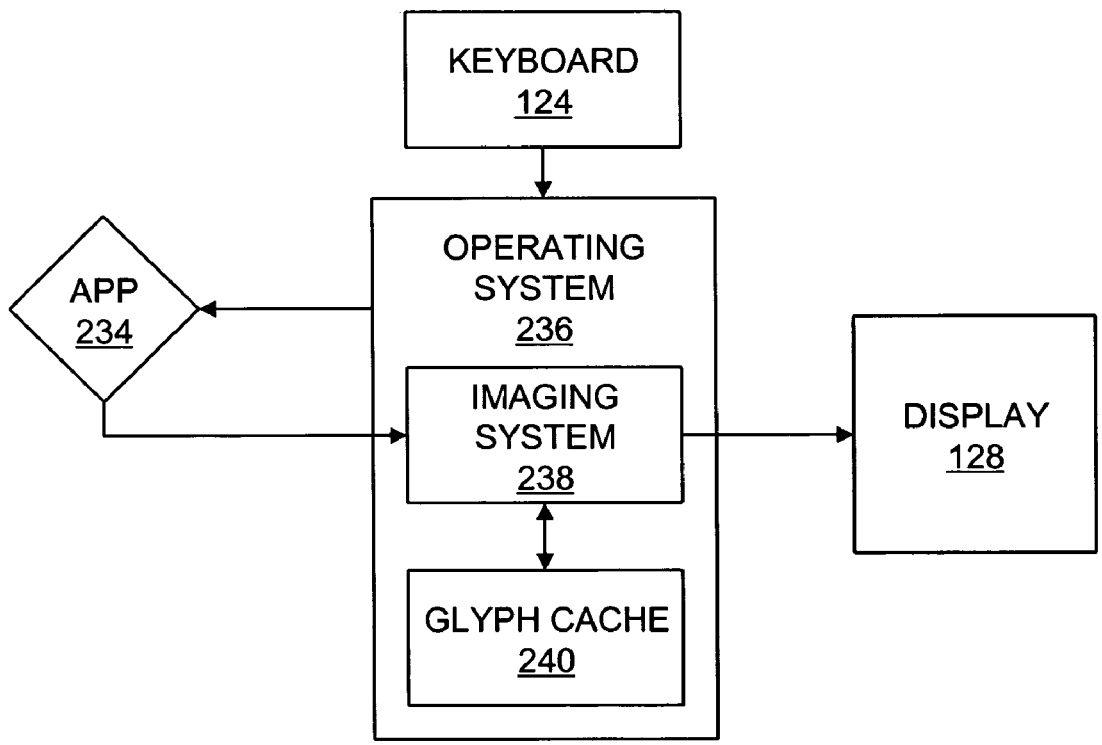
FIG. 2 depicts a block diagram of an exemplary software architecture for implementing an embodiment of the present invention.

The general architecture of software programs that are loaded into the RAM 116 and executed on the computer 100 is illustrated in the block diagram of FIG. 2. In a typical situation, the user interacts with one or more application programs 234, such as a word processing program, a desktop publishing program, a graphics program, or a web page authoring program, etc. In operation, as the user types via the keyboard or other input device 124, the application program issues requests to the computer's operating system 236 to have the characters corresponding to the keystrokes drawn on the display 128. Similarly, when the user enters a command to print a document, the application program issues requests to the operating system which cause the corresponding characters to be printed via the printer 130. For illustrative purposes, the following description of the operations according to the present invention will be provided for the example in which characters are drawn on the screen of the display 128 in response to user-entered keystrokes. It will be appreciated, however, that similar operations are carried out in connection with the printing of characters in a document on the printer 130 or other medium or device.

When a user types a character via the keyboard 124, an indication of that event is provided to the application program 234 by the computer's operating system 236. In response, the application program issues a call to the computer's imaging system 238 to draw the character corresponding to the keystroke at a particular location on the display. That call includes a character code that designates a particular letter or other element of text, and style information such as an identification of the font for the corresponding character. The imaging system 238 is a component of the computer's operating system 236. In the case of the Macintosh® operating system, for example, the imaging system may be Quartz® or QuickDraw®.

Upon receipt of the request for a character, the imaging system 238 accesses a glyph cache 240, which contains bitmap images of characters. If the requested character has been previously displayed in the designated style, its image will be stored in the glyph cache, and immediately provided to the imaging system. If, however, the requested character is not found in the cache (cache miss), a bitmap is generated and attempted to be inserted into the glyph cache 240.

Figure 3:
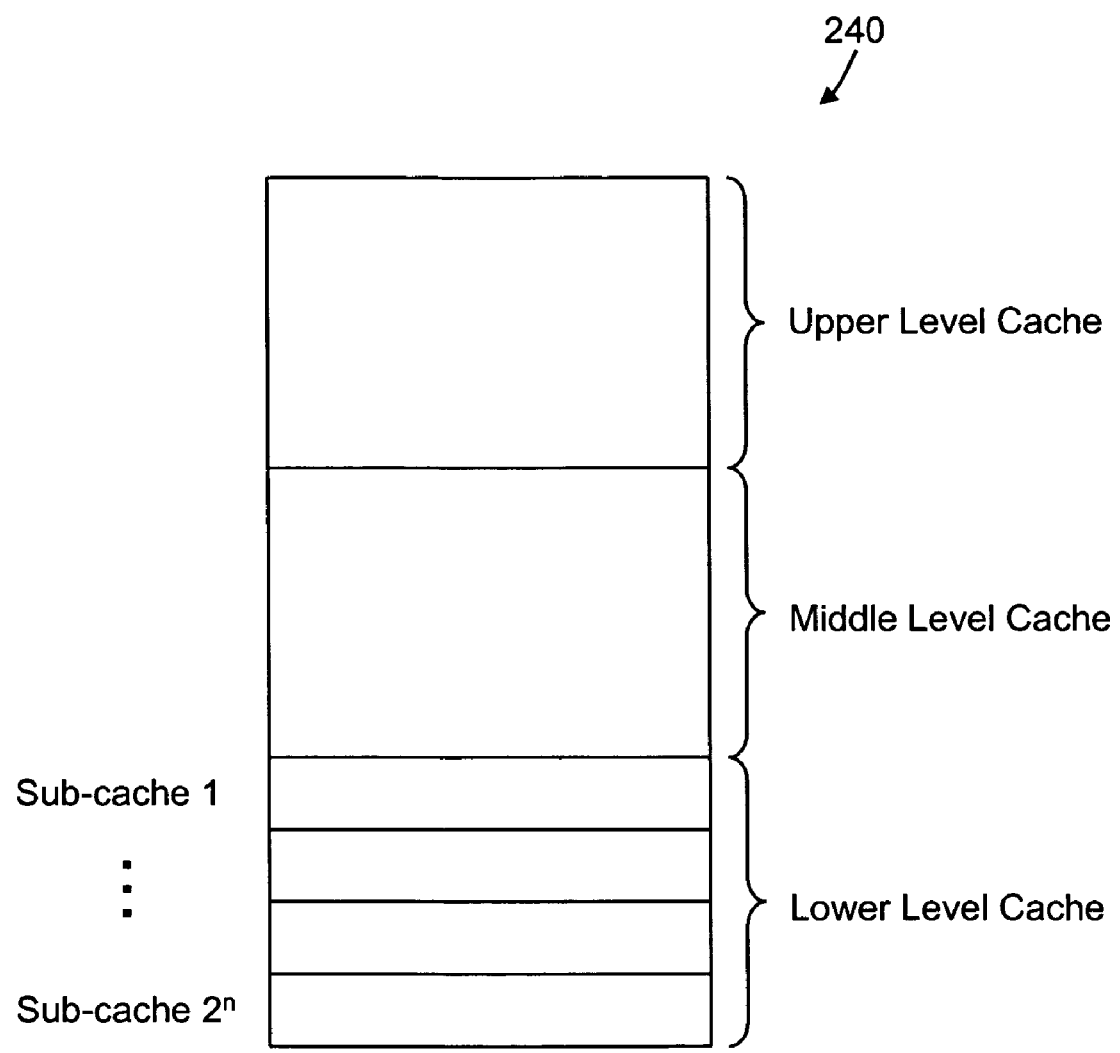
FIG. 3 depicts an exemplary cache architecture for implementing an embodiment of the present invention.

An exemplary cache architecture is depicted in FIG. 3. The exemplary cache 240 includes an upper level cache comprising a hash table and direct index combination, a middle level cache comprising a list of sub-caches, and a lower level cache comprising the sub-caches where the bitmaps may be stored. Direct lookups (an array with one entry for every glyph in the font) provide for fast access for normal fonts. The correct cache is found by looking up in a hash table using font, quantization, and size. For the correct cache, the bitmap is inserted using a glyphID. Using a direct array lookup by glyphID allows for fast insertions. If a font has many, many glyphs, the hash table is used to store glyphs that have large glyphIDs. The upper level cache will typically be successful in insertion virtually every time, and then it will call the middle level bitmap storage delegate to actually store the glyph bitmap.

In accordance with one embodiment of the present invention, the glyph cache is comprised of a number of sub-regions referred to as sub-caches (the lower level cache). The number of sub-caches may be $2^n$, where n can be tuned or adjusted to optimize packing and speed.

In order to insert the glyph bitmap into the cache, a list of all sub-caches is obtained. The middle level cache is the collection of sub-regions that manages the GPU/OpenGL texture, and contains a list of lower level caches. For each sub-cache, the new bitmap is attempted to be inserted into the two-dimensional (2D) array of glyphs in the sub-cache until it is successfully inserted into one of the sub-caches. If insertion is not successful, however, then an entire sub-cache is destroyed, or cleared, in order to accommodate the new bitmap. It is generally desired to clear older glyphs which have not been used relatively recently. Thus, rather than deleting individual glyphs, which would result in 2D packing hole creep when the glyph being deleted is larger that the glyph being inserted, an entire sub-cache is destroyed, or cleared, in accordance with one embodiment of the present invention.

The process for selecting which sub-cache to destroy may comprise selecting from an iterative sequence. For example, if there are four sub-caches, the order of destruction may be as follows: sub-cache 1, sub-cache 2, sub-cache 3, sub-cache 4, sub-cache 1, sub-cache 2, sub-cache 3, sub-cache 4, sub-cache 1, etc.

Once a sub-cache is selected for destruction, for each entry in the middle level sub-cache being cleared, a call is made which sends a message back to the upper level cache to clear its fast lookup entry. The lowest level cache is instructed to init to zero size. In other words, the values are reset to zero entries, etc. Advantageously, this is much more efficient than actually destroying texture resources.

Next, the purged lowest level cache is moved to the end of the purge list order. For example, where there are four sub-caches and sub-cache 1 was just cleared, the order of destruction would then become sub-cache 2, sub-cache 3, sub-cache 4, sub-cache 1, sub-cache 2, sub-cache 3, sub-cache 4, sub-cache 1, etc. The glyph bitmap can now be inserted into the cleared sub-cache.

Figure 4A:
FIG. 4A depicts an example of text rendered without intersecting glyphs.
Figure 4B:
FIG. 4B depicts an example of text rendered with intersecting glyphs.

Reference is now made to FIGS. 4A and 4B which illustrate how glyphs may be positioned differently with and without kerning. Kerning refers to an adjustment to the normal spacing between two or more glyphs. A kerning pair comprises two adjacent glyphs such that the position of the second glyph is changed with respect to the first. Any adjustments to glyph positions are specified relative to the point size of the glyphs. Kerning usually improves the apparent letter-spacing between glyphs that fit together naturally. As shown in FIGS. 4A and 4B, the text is shorter with kerning (FIG. 4B) than without kerning (FIG. 4A).

In FIG. 4B, the glyphs are depicted as intersecting, while the glyphs in FIG. 4A do not intersect. In FIGS. 4A and 4B, an imaginary line is drawn between each glyph to illustrate the intersections (as shown in FIG. 4B) or the absence of intersections (as shown in FIG. 4A).

To maximize deferral of glyph rendering, glyphs may be monitored for intersections, and when glyphs intersect, an intersection is marked. Upon an intersection, a command is inserted into the command stream. In the case of tightly packed glyphs, they may all intersect, in which case "even-odd flushing" occurs, dropping the number of separate command sequences from one per glyph to two per stream. This technique is advantageous, because the hardware processes large packets much more optimally than small packets. Indexed rendering can be used to flush the stream once, and then two draw calls are submitted instead of a much larger number of calls, corresponding to the number of glyphs in the stream. Indexed rendering uses a technique in which the glyphs to be drawn are submitted once in a large packet, and then the GPU is instructed later, in small optimal commands, which indices to draw.

When drawing many glyphs, it is not optimal to compare each new glyph in the command with all previous glyphs about to be drawn. For example, in the case of 5 letters being drawn, the number of comparisons would be 1+2+3+4, or a total of ten two-dimensional comparisons.

Figure 5:
FIG. 5 depicts an example of text rendered with a changing line slope.

Instead, each new glyph being drawn can simply be compared to the previously drawn glyph. If it intersects, an intersection is marked. If not, the glyph is added to the command stream. If there is an intersection, the direction, i.e., the slope of the line between the glyphs being drawn, is checked. The direction or flow of the characters is monitored by monitoring the advances between glyphs. For example, in the English language, text normally flows from left to right, and lines of text flow from top to bottom. As long as that is the case, ending a command stream can be avoided. Of course, this applies to any regular flow, be it right to left and then top to bottom to top to bottom and then right to left. In the atypical case, for example, if glyphs are drawn in a circle or in a spiral, etc., command stream stops and starts occur more often. FIG. 5 illustrates an example of text rendered with a change in line slope. If the line between glyphs suddenly changes direction (i.e., the sign of the slope x, y changes), an intersection is marked, and the current command stream is ended and a new command stream is started, in certain embodiments. In a further improvement to those embodiments, if the slope changes radically, but the slope of the overall line flow (i.e., the line drawn from the first character of each line) does not change, the text is flowing towards the blank part of the page, and an intersection is not marked.

Instead of stopping the current command stream and starting a new command stream at each marked intersection, an alternative method for texture cache flushing is provided in accordance with another embodiment according to the present invention. In texture cache flushing, the graphics card flushes only the caches for the textures currently bound for a particular texture unit. First the command stream is set up as if all of the glyphs are going to be drawn, not stopped and started as above. Then a drawing command is executed only for the glyphs up to the first intersection mark. This places a drawing command into the command stream. Next, instead of calling glFlush( ) as above, which stops and starts the command streams and which is rather expensive to do as it involves round trips to the kernel, a function such as glFlush-TextureUnit(LetterTexture) is executed, which only puts a command into the command stream right after the drawing command that was just sent. This inclusion of the drawing command and the texture cache flush command are done for every glyph intersection in the command buffer. Alternatively, the drawing and texture flush commands can be inserted into the command stream as the glyphs are drawn.

The glFlushTextureUnit( ) function instructs the GPU to clear its high speed cache memory close to its renderers, forcing a refetch from its texture memory farther from its renderer. This is done because although the information has changed, the GPU does not know the information has changed because the texture unit is pointed at the memory the GPU is currently rendering to. The GPU does not normally know how to maintain coherence; therefore, upon occurrence of an intersection, the texture unit cache is flushed, which re-fetches into the high speed rendering local cache, and thus maintains coherence. Advantageously, this allows for read/modify/write operations with the GPU.

The following command stream illustrates an example of texture cache flushing:

```
---------------------------
start command
glyphs
draw command
flush texture unit
glyphs
draw command
flush texture unit
glyphs
stop command
--------------------------- KERNEL ROUND TRIP . . .
```

The above example is much faster and more efficient, having no command stream breakage, and only a kernel round trip at the end, as compared to the following:

```
start command
glyphs
stop command
--------------------------- KERNEL ROUND TRIP . . .
start command
glyphs
stop command
--------------------------- KERNEL ROUND TRIP . . .
start command
glyphs
stop command
--------------------------- KERNEL ROUND TRIP . . .
```

From the foregoing description it will be appreciated that novel solutions have been provided by the present invention that radically reduce the number of intersection checks, and radically reduce the cost of flushing the stream. By using the new image resource architecture, texture switch costs are avoided, upload costs are minimized, and ongoing management is kept to a minimum, by bulk destroying whole swaths of glyph data. This is highly advantageous, since the highest costs in GL are create/delete operations, and a significant problem for long term systems is decreasing utilization due to 2D packing hole creep.

By deferring glyph rendering into bulk packets, commands are submitted to the hardware for execution in a much more efficient manner. To make as much deferral as possible, glyphs are monitored for intersections, and common case intersections are dealt with using novel command stream techniques. The inventive solutions are particularly advantageous with respect to LCD text rendering where no letters are drawn at the same time that intersect.

Another technique to increase speed and efficiency in accordance with one embodiment of the present invention is to put color into the command stream with the glyphs. Therefore, even if the color changes, the glyphs do not need to be separated into groups.

Yet another technique to increase speed and efficiency in accordance with one embodiment of the present invention provides for only actually drawing the glyphs if the program above us tells us to flush everything (they do this at the end of all of their drawing) or if they draw something else other than letters.

By utilizing the foregoing novel techniques, an entire page of glyphs can be advantageously drawn in one command where intersections are not encountered.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as exemplary embodiments. Various modifications may be made without departing from the scope of the invention. For example, equivalent elements or materials may be substitute for those illustrated and described herein, and certain features of the invention may be utilized independently of the use of other features, all as would be apparent to one skilled in the art after having the benefit of this description of the invention. In addition, the terms "a" and "an" are generally used in the present disclosure to mean one or more.

I claim:

1. A method for rendering text, the method comprising the steps of:
    adding a first command to a command stream to draw a first glyph;
    developing a second command to draw a second glyph;
    determining an occurrence of an intersection between the first glyph and the second glyph;
    upon the occurrence of the intersection, inserting a command transition in the command stream between the second command and the first command;
    providing the command stream to display hardware; and
    the display hardware displaying the glyphs on a display.

2. The method as claimed in claim 1, wherein the step of determining the occurrence of an intersection between the first glyph and the second glyph comprises determining an occurrence of a change in the slope of a line drawn from the first glyph to the second glyph and indicating an intersection on the occurrence of the change.

3. The method as claimed in claim 2, wherein if the slope of the line flow of the first character in the line to the second glyph does not change, an intersection is not indicated.

4. The method as claimed in claim 1, wherein the command transition is the termination of the command stream containing the first glyph and the starting of a new command stream containing the second glyph.

5. The method as claimed in claim 1, wherein the command transition is the insertion of a texture unit flush command into the command stream and the second glyph is included in the command stream after the texture unit flush command.

6. A computer-readable medium having computer-executable instructions for performing the method comprising:
    adding a first command to a command stream to draw a first glyph;
    developing a second command to draw a second glyph;
    determining an occurrence of an intersection between the first glyph and the second glyph;
    upon the occurrence of the intersection, inserting a command transition in the command stream between the second command and the first command; and
    providing the command stream to display hardware.

7. The method as claimed in claim 6, wherein the step of determining the occurrence of an intersection between the first glyph and the second glyph comprises determining an occurrence of a change in the slope of a line drawn from the first glyph to the second glyph and indicating an intersection on the occurrence of the change.

8. The method as claimed in claim 7, wherein if the slope of the line flow of the first character in the line to the second glyph does not change, an intersection is not indicated.

9. The method as claimed in claim 6, wherein the command transition is the termination of the command stream containing the first glyph and the starting of a new command stream containing the second glyph.

10. The method as claimed in claim 6, wherein the command transition is the insertion of a texture unit flush command into the command stream and the second glyph is included in the command stream after the texture unit flush command.

11. A computer system for rendering text, the system comprising:
    a central processing unit;
    a graphics processor unit;
    a memory operatively coupled to the graphics processor unit and to the central processing unit;
    a connection coupled to the graphics processor unit to allow a display device to be operatively coupled to the graphics processor unit; and
    an application executable within the central processing unit and memory, the application performing the method comprising:
    adding a first command to a command stream to draw a first glyph;
    developing a second command to draw a second glyph;
    determining an occurrence of an intersection between the first glyph and the second glyph;
    upon the occurrence of the intersection inserting a command transition in the command stream between the second command and the first command; and
    providing the command stream to display hardware.

12. The method as claimed in claim 11, wherein the step of determining the occurrence of an intersection between the first glyph and the second glyph comprises determining an occurrence of a change in the slope of a line drawn from the first glyph to the second glyph and indicating an intersection on the occurrence of the change.

13. The method as claimed in claim 12, wherein if the slope of the line flow of the first character in the line to the second glyph does not change, an intersection is not indicated.

14. The method as claimed in claim 11, wherein the command transition is the termination of the command stream containing the first glyph and the starting of a new command stream containing the second glyph.

15. The method as claimed in claim 11, wherein the command transition is the insertion of a texture unit flush command into the command stream and the second glyph is included in the command stream after the texture unit flush command.

* * * * *

UNITED STATES PATENT AND TRADEMARK OFFICE
CERTIFICATE OF CORRECTION

| | | |
|---|---|---|
| PATENT NO. | : 7,623,130 B1 | Page 1 of 1 |
| APPLICATION NO. | : 11/113815 | |
| DATED | : November 24, 2009 | |
| INVENTOR(S) | : Burkey | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 947 days.

Signed and Sealed this

Second Day of November, 2010

David J. Kappos
*Director of the United States Patent and Trademark Office*